United States Patent
Thomas

(10) Patent No.: US 6,729,228 B2
(45) Date of Patent: May 4, 2004

(54) DEVICES FOR CLEANING AN EAR OF CORN AND METHODS

(76) Inventor: John L. Thomas, 480 Lees Lake Rd., Fayetteville, GA (US) 30214

( * ) Notice: Subject to any disclaimer, the term of this patent is extended or adjusted under 35 U.S.C. 154(b) by 228 days.

(21) Appl. No.: 09/977,772

(22) Filed: Oct. 15, 2001

(65) Prior Publication Data

US 2003/0070567 A1 Apr. 17, 2003

(51) Int. Cl.[7] .............................. A23L 1/00; A23N 7/00
(52) U.S. Cl. .............................. 99/567; 99/537; 99/590; 99/636; 99/643
(58) Field of Search .................. 99/537–541, 542–545, 99/584, 588, 635–643, 467; 460/29, 40, 45, 17, 52, 51, 54, 56

(56) References Cited

U.S. PATENT DOCUMENTS

| 240,052 A | 4/1881 | Stover | |
|---|---|---|---|
| 1,127,548 A | 2/1915 | Turner | |
| 2,063,483 A | 12/1936 | Bulmer | 130/9 |
| 2,326,873 A | 8/1943 | Meek | 146/4 |
| 3,451,397 A | * 6/1969 | Rauth | 99/636 |
| 4,892,034 A | * 1/1990 | Miles | 99/567 |
| 5,097,758 A | 3/1992 | Fresh | 99/590 |
| 6,305,276 B1 | 10/2001 | Backus | 99/514 |
| 6,463,845 B1 | * 10/2002 | Thomas | 99/514 |

* cited by examiner

*Primary Examiner*—Timothy F. Simone
(74) *Attorney, Agent, or Firm*—Thomas, Kayden, Horstemeyer & Risley, LLP

(57) ABSTRACT

A preferred device for cleaning an ear of corn including at least one of shuck and silk includes a platform having a top surface and a bottom surface. A cob cleaner aperture arranged in the platform is configured to receive the ear of corn therethrough. A cleaning member extends into the cob cleaner aperture and is adapted to engage the ear of corn inserted into the cob cleaner aperture. The cleaning member is adapted to remove at least a portion of at least one of the shuck and silk as the ear of corn is rotated and engages the cleaning member. Methods of operation are also provided.

19 Claims, 6 Drawing Sheets

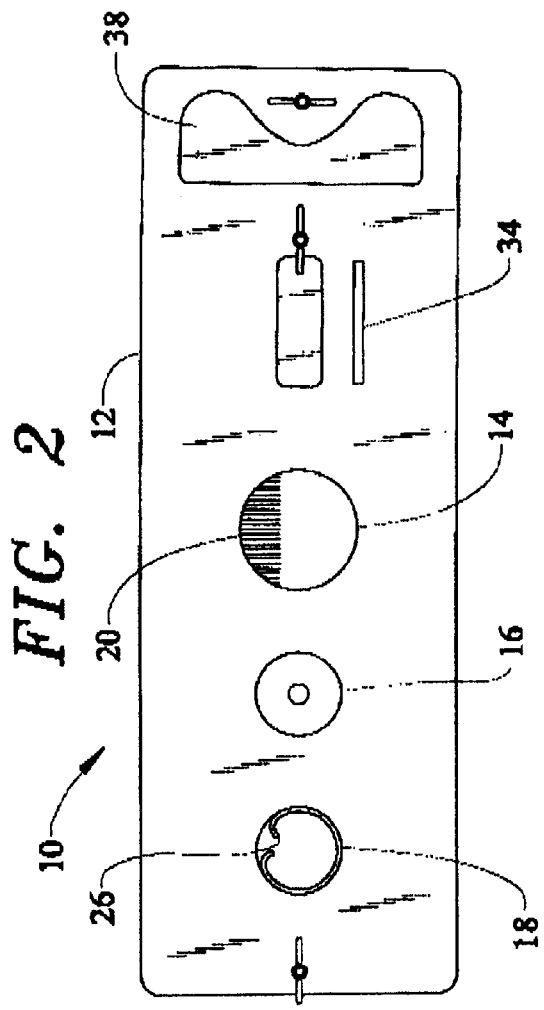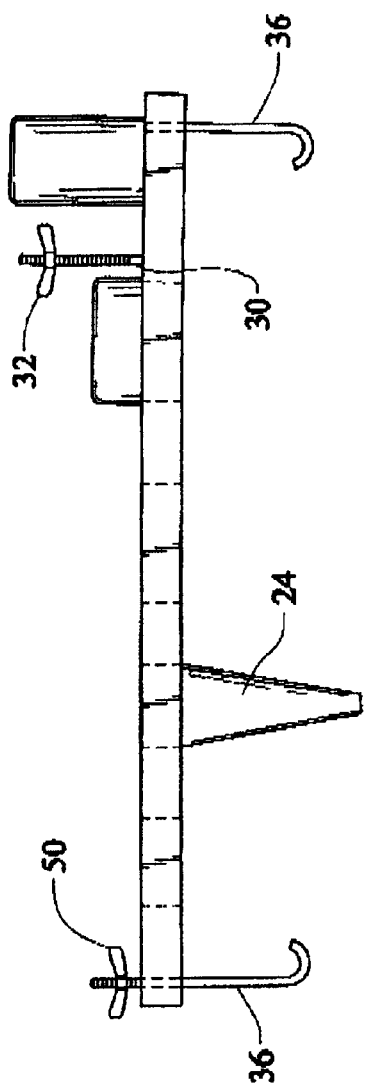

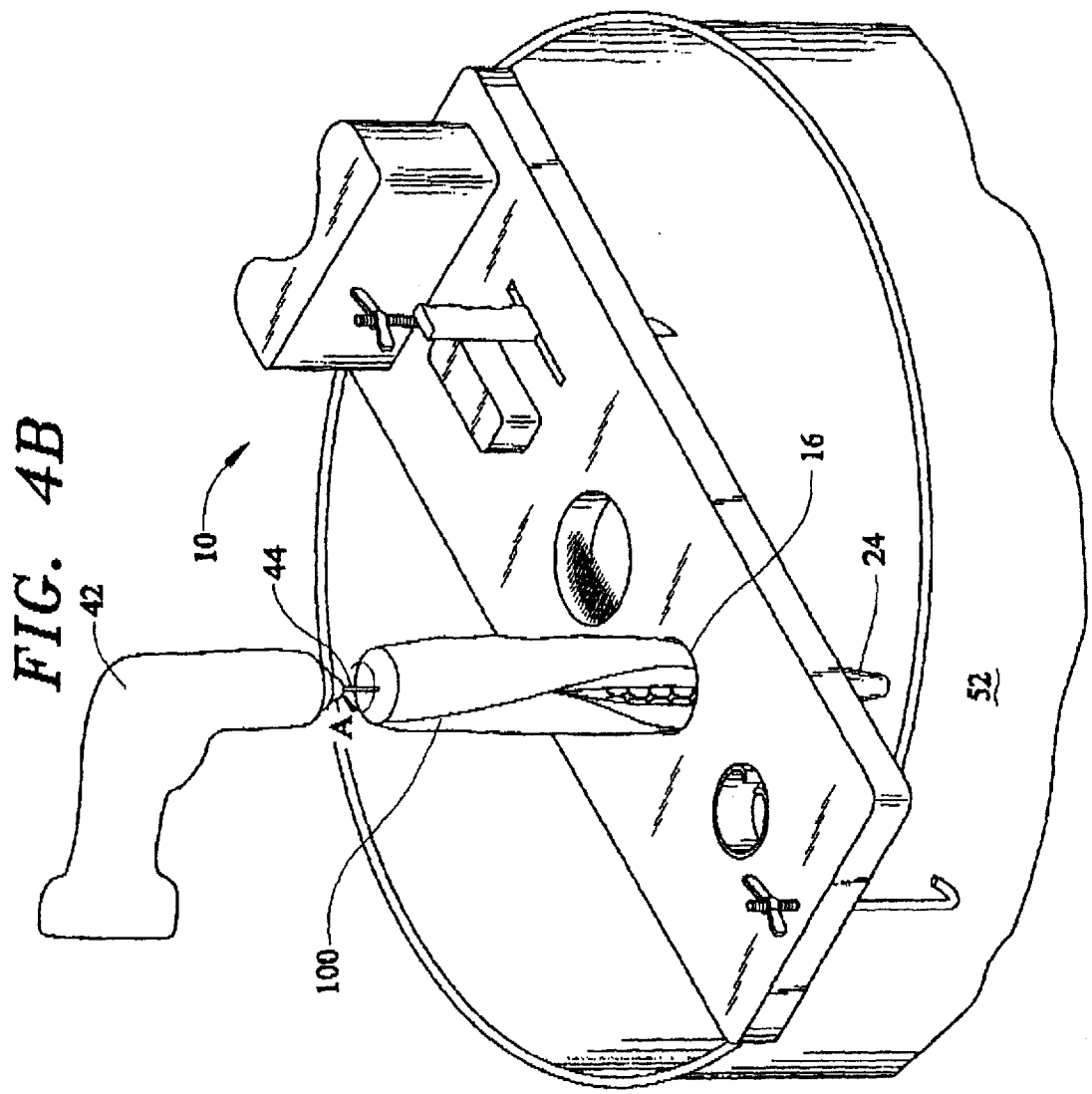

DEVICES FOR CLEANING AN EAR OF CORN AND METHODS

BACKGROUND OF THE INVENTION

1. Field of the Invention

The present invention generally relates to food preparation and, in particular, to devices and methods for cleaning an ear of corn.

2. Description of the Related Art

Many vegetables and fruits require cleaning before they can be consumed, prepared for consumption or prepared for storage. The cleaning of many such foods requires not only removal of dirt and pesticides that may be present but also removal of natural protective coatings, shells, rinds, etc. More specifically, an ear of corn grows and is harvested as a cob of corn encased in a substantially leafy covering, the "shuck," and fine silk-like threads, the "silk," thereunder. The ear of corn is not ready to be consumed, prepared for consumption or prepared for storage until the shuck and silk are both removed and the kernels exposed.

Conventionally, each ear of corn is cleaned by hand. For example, one end of the ear of corn is grasped with one hand while the shuck is peeled away from the opposite end of the cob with one's other hand, exposing the silk or some portion thereof. The silk is then removed in a similar manner by peeling it away from the cob to expose the kernels. The silk, however, can be particularly difficult to remove in that each strand is fine and may be pinched between kernels. As such, it is often difficult to remove all of the silk. The ear of corn can then be stored, such as frozen, prepared for consumption, for example boiled for consumption as corn-on-the-cob or cut from the cob, or used to prepare cream-style corn. This removal process can be time consuming and laborious, especially when many ears of corn need to be cleaned, for example to store a substantial volume of ears that have been harvested from a garden or to prepare a dish that requires many ears of corn, such as cream-style corn.

Therefore, there is a need for improved devices and methods that address these and/or other shortcomings of the prior art.

SUMMARY OF THE INVENTION

Briefly described, the present invention relates to devices and methods for cleaning an ear of corn. In this regard, an embodiment of a device for cleaning an ear of corn including at least one of shuck and silk includes a platform having a top surface and a bottom surface. A cob cleaner aperture arranged in the platform is configured to receive the ear of corn therethrough. A cleaning member extends into the cob cleaner aperture and is adapted to engage the ear of corn inserted into the cob cleaner aperture. As the ear of corn is rotated and pressed against at least a portion of the cleaning member, at least a portion of at least one of the shuck and silk are removed from the ear of corn.

Some embodiments of the present invention may also be construed as providing methods for cleaning an ear of corn encased in shuck and silk. One such method includes the steps of: rotating the ear of corn about a longitudinal axis thereof; and engaging the ear of corn with a cleaning member disposed substantially adjacent the cleaner aperture. The cleaning member is adapted to remove at least a portion of the shuck and silk.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

FIG. 2 illustrates a plan view of a top surface of a platform of the embodiment of the device for cleaning an ear of corn illustrated in FIG. 1.

FIG. 3 illustrates a side view of a platform of the embodiment of the device for cleaning an ear of corn illustrated in FIG. 1.

FIG. 4B illustrates a perspective view of the embodiment of the device of FIG. 1 having an ear of corn position in a cob support aperture.

DETAILED DESCRIPTION

Figure 1:
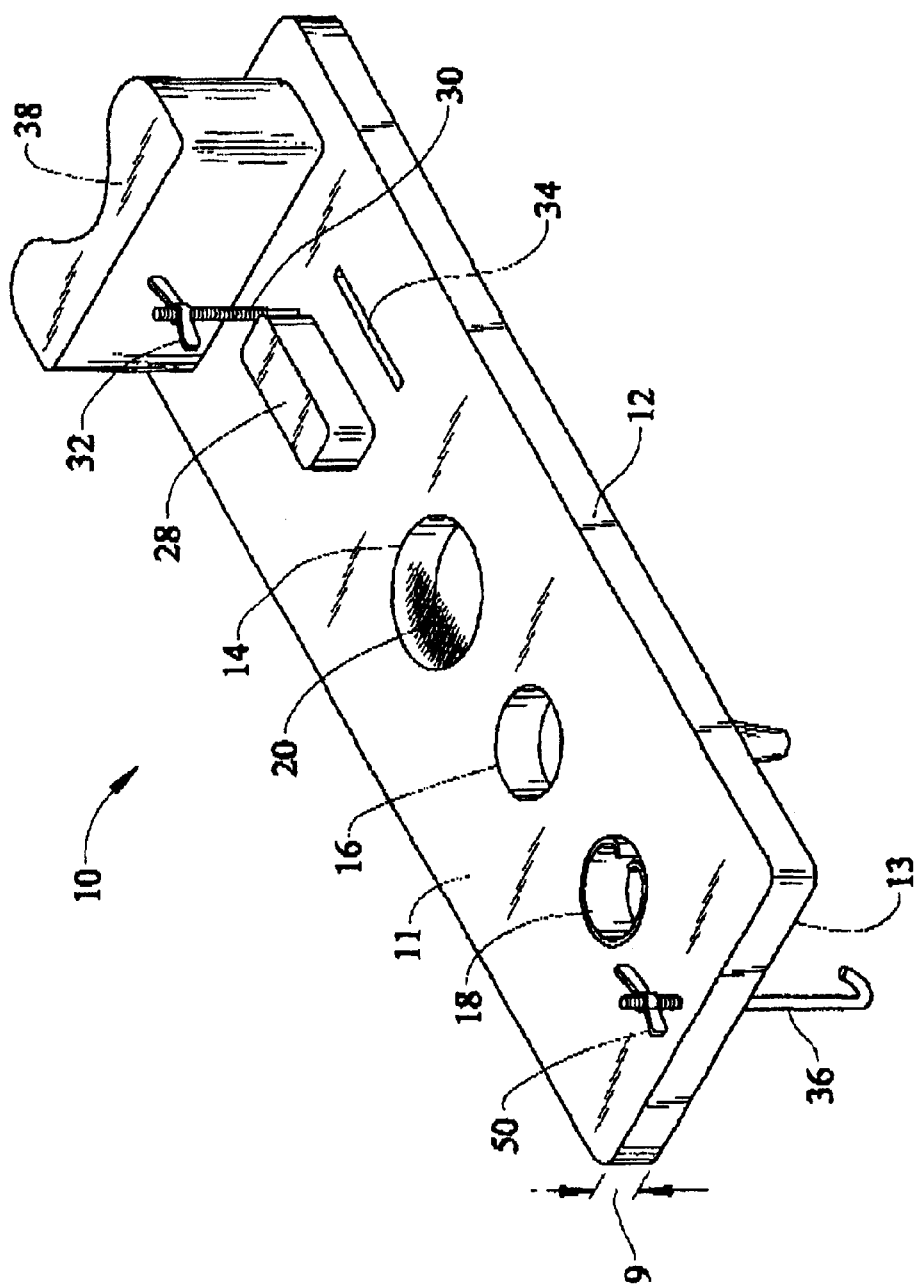
FIG. 1 illustrates a perspective view of an embodiment of the device for cleaning an ear of corn.

The present invention generally provides a device and method for removing at least a portion of shuck and silk from an ear of corn. Reference will now be made to the drawings wherein like numerals indicate corresponding parts throughout the several views. As shown in FIGS. 1 through 3, an embodiment of the corn cleaning device 10 incorporates a platform 12 having a thickness 9, a top surface 11 and a bottom surface 13. The platform 12 includes a cob cleaner aperture 14, a cob support aperture 16, and a cob removal aperture 18, each disposed therethrough. The cob cleaner aperture 14 removes at least a portion of one of shuck and silk from an ear of corn when the ear of corn is engaged therewith. The cob support aperture 16 can be implemented to support the ear of corn in a substantially upright position in order to engage a tool, such as a hand-held drill 42, with and end of the ear of corn. The ear of corn, engaged with the hand-held drill 42, can be engaged in the cob removal aperture 18 for assistance with disengaging the hand-held drill from the ear of corn 100.

The platform 12 can be configured in numerous manners, such as rectangular, circular, triangular, or any suitable shape. It should be noted that although the platform 12 is illustrated herein as formed of a substantially uniform thickness 9, the platform 12 can comprise a thickness that is substantially non-uniform, such as a tapered thickness, randomly varied thickness, or the like. Similarly, the cob cleaner aperture 14, the cob support aperture 16, and the cob removal aperture 18 can each comprise any suitable shape, such as circular, square, triangular, etc., and can be arranged in any configuration with respect to each other and are all configured to receive at least a portion of an ear of corn. The platform 12 can comprise any of numerous materials, such as wood, plastic, or any suitable substantially rigid material.

Cob cleaner aperture 14 is disposed through the platform 12 and can include a cleaning member 20 therewith for removal of shuck and silk from an ear of corn. As an example, the cleaning member 20 can comprise a cleaning brush that can be disposed internal to the cob cleaner aperture 14 or substantially adjacent thereto. Bristles comprising the cleaning brush extend from an edge of the cob cleaner aperture 14 toward an interior portion of the cob cleaner aperture 14. The cob cleaner aperture 14 and cleaning member 20 are preferably arranged and configured such that an ear of corn can be disposed fully therethrough and beyond the cleaning member 20. The cleaning member 20 is arranged and configured to remove the shuck and silk when the ear of corn is engaged therewith, as is described in more detail hereinafter.

Cob support aperture 16 is disposed through the platform 12 and preferably arranged and configured to engage at least a portion of the ear of corn and support the ear of corn in a substantially upright position. In operation, as discussed in more detail below, cob support aperture 16 can be used to support an ear of corn still having at least a portion of the shuck and silk still encasing the cob. Cob support 24 provides increased stability to an upright supported ear of corn. Cob support 24 extends from the lower surface 13 of the platform 12 and is substantially axially aligned with the cob support aperture 16. Cob support 24 is configured and positioned on the device 10 such that a cob disposed into and through the cob support aperture 16 is wedged into the cob support 24. Cob support 24 can be configured in numerous manners, such as rectangular, circular, conical, or any suitable shape. It is preferred that the cob support aperture 16 provide secure, stable, upright support of the ear of corn during processing, e.g., when a drill bit 44 of a hand-held drill 42 is disposed in an end of the ear of corn in a substantially axial manner, as disclosed in greater detail hereinbelow. Thus, the aperture 16 typically exhibits a smaller diameter than aperture 20.

Cob removal aperture 18 is disposed through the platform 12 and preferably arranged and configured to engage at least a portion of the ear of corn and support the ear of corn in a substantially upright position. In operation, as discussed in more detail below, cob removal aperture 18 can be used to support an ear of corn having all or a majority of the shuck and silk removed from the cob. Cob removal aperture 18 can comprise a grip 26 disposed therein. Grip 26 comprises a rectangular strip of material disposed within cob removal aperture 18 and substantially corresponding thereto. Longitudinally opposing ends of grip 26 do not meet each other and are arranged and configured to extend inward into the internal volume of cob removal aperture 18. As such, grip 26 engages an ear of corn inserted into cob removal aperture 18. Grip 26 comprises substantially flexible or rigid material capable of releasably engaging the cob. It is preferred that the cob removal aperture 18 and grip 26 provide a secure, stable grip of the ear of corn during processing, e.g., when removing a drill bit 44 of a hand-held drill 42 is disengaged from the ear of corn, as disclosed herein in regards to the operation of the device.

The device for cleaning an ear of corn 10 can also comprise a cutting surface 28 and a tool level 30. Cutting surface 28 is a substantially planar surface and can be flush with the top surface 11 of the platform 12, but is preferably raised therefrom, as can be seen in FIGS. 1 and 3. Tool level 30 is disposed substantially adjacent cutting surface 28 and includes a tool level adjuster 32. Tool level 30 can comprise any suitable member such as, for example, an elongated, threaded member. Tool level adjuster 32 can comprise any suitable member, such as, for example, a wing nut, bolt, or the like, arranged and configured to engage the threads of the tool level 30. Tool level adjuster 32 can be moved axially along tool level 30 toward or away from the top surface 11 of the platform 12 by rotating the tool level adjuster 32 about the tool level 30, effectively "screwing" the tool level adjuster 32 up and down the tool level 30 as desired. It is preferable that the tool level adjuster 32 be adjusted such that an end of a cutting tool 46, such as a tip of a knife blade, can engage the tool level adjuster 32 and pivot thereabout toward cutting surface 28 until the cutting tool 46 is substantially parallel to cutting surface 28 as the cutting tool 46 makes contacts therewith. In this manner the tool level adjuster 32 provides leverage for cutting an ear of corn placed on the cutting surface 28. An optional but oftentimes desirable cutting tool holder 34 can be disposed in the platform 12 and is preferably arranged and configured to releasably receive a knife or other suitable cutting tool that may be used with the device for cleaning an ear of corn 10.

Platform support 36 can be included and extends away from the bottom surface 13 of the platform 12. Platform support 36 is arranged and configured to engage an open end of a receptacle, such as a garbage can, so that the discarded portions of the ear of corn can be disposed of immediately during operation, as disclosed in more detail herein. Platform support 36 can comprise a threaded hook arranged and configured to engage the platform 12 at a fixing aperture 48 disposed therethrough and fixed in position with a support fixing member 50, such as bolt, wing nut, or the like. Corn creamer support 38 can also be included on the platform 12. Corn creamer support 38 is arranged and configured to receive a device for making cream-style corn as disclosed in U.S. patent application Ser. No. 09/689,149, titled "Device For Making Cream-Style Corn And Method," filed on Oct. 12, 2000, the disclosure of which is hereby incorporated by reference.

OPERATION

Figure 4A:
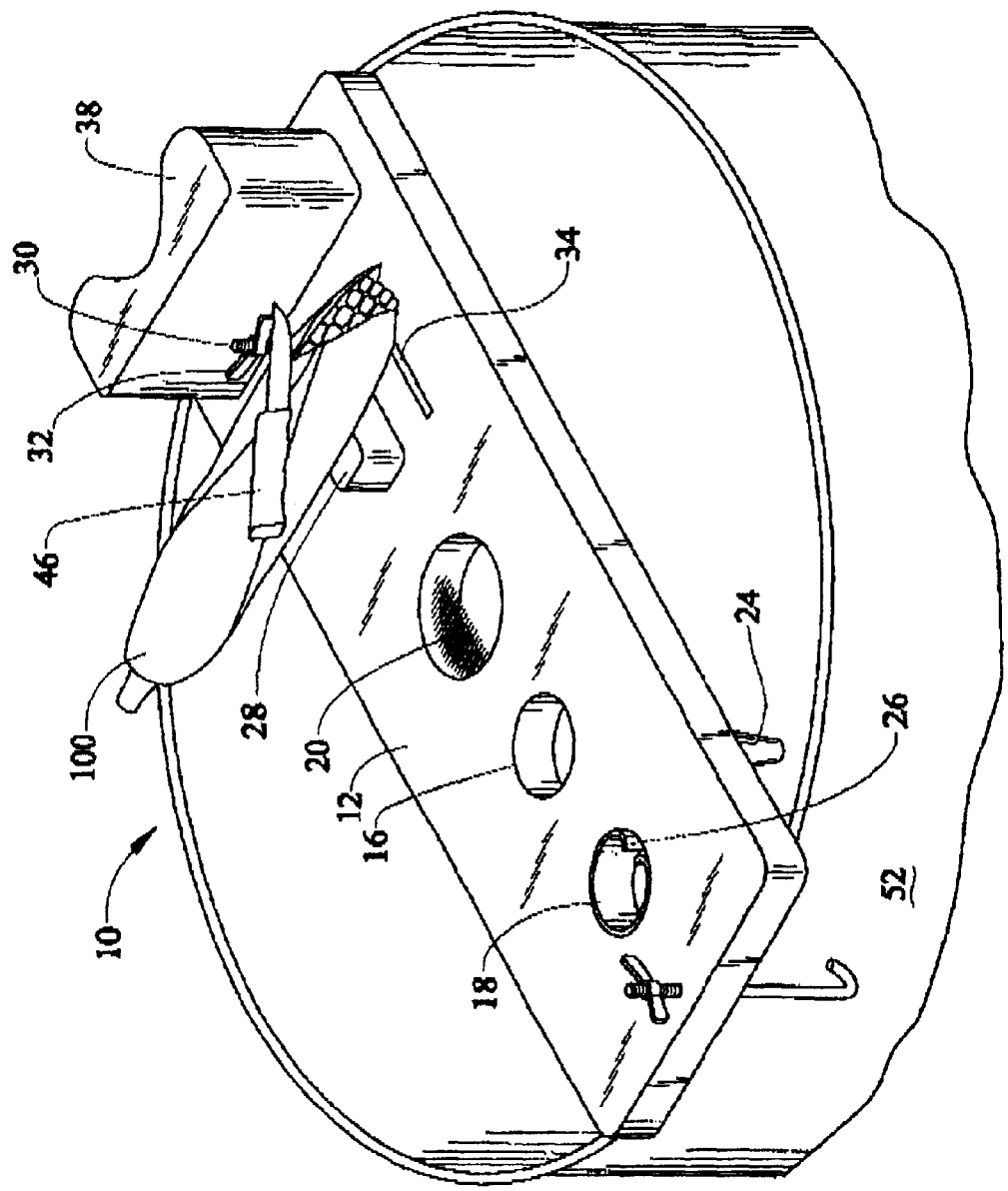
FIG. 4A illustrates a perspective view of the embodiment of the device of FIG. 1 having an ear of corn positioned on a cutting surface.

FIGS. 4A through 4D illustrate a method of operation of the device 10 disclosed herein. Referring first to FIG. 4A, it is preferable that the corn cleaning device 10 is positioned over the open portion of a receptacle 52, such as a garbage can, or the like, to collect portions of an ear of corn to be discarded during operation of the corn cleaning device 10. The corn cleaning device 10 engages the receptacle 52 with the platform support 36, as disclosed hereinabove. If the corn cleaning device 10 is to be used in conjunction with a device for making cream-style corn (not shown), the corn creamer device can be mounted to the corn cleaning device 10 at the corn creamer support 38.

Operation of the corn cleaning device 10 is facilitated by adjusting the position of the cutting tool level adjuster 32. The cutting tool level adjuster 32 is preferably disposed at a distance from the cutting surface 28 such that when a tip portion of a cutting tool 46, such as a knife, is engaged with the cutting tool level adjuster 32 a blade portion of the knife 46 is substantially parallel to the cutting surface 28 disposed on the platform 12. A full ear of corn 100, having at least a portion of the shuck and silk encasing the cob, is positioned on the cutting surface 28 and substantially aligned with the cutting tool level 30 at the point where a cut is desired, preferably to remove an end of the ear of corn. The tip of the knife 46, is engaged with the cutting tool level adjuster 32 and the knife 46 is pivoted thereabout toward cutting surface 28 until the ear of corn 100 is engaged and the cutting surface 28 is contacted, thereby slicing the ear of corn 100. The undesirable portion of the ear of corn 100, the end, can be discarded. The ear of corn is turned such that opposing end of the ear of corn can be removed in a similar manner as described above. The knife 46 then can be placed in the cutting tool holder 34.

As illustrated in FIG. 4B, the blunt-ended ear of corn 100 is placed in the cob support aperture 16, preferably with the broadest end upward. Depending on the size of the ear of corn 100 in relation to cob support aperture 16, at least a portion of ear of corn 100 may extend through cob support aperture 16 and into at least a portion of cob support 24. Ear of corn 100 is wedged into cob support 24 whereby cob support 24 provides additional stability to the ear of corn 100. A drill, such as hand-held drill 42, is engaged with the blunt, upward facing end of the ear of corn 100, for example by rotating the bit 44 in direction A while holding the ear of corn 100 stationary. Insertion of the bit 44 into the cob 100 results in a slight expansion in diameter of the cob 100. The slight expansion of the volume of the cob of corn inside the shuck and silk may result in a portion of the shuck and silk coming loose from the ear of corn 100.

Figure 4C:
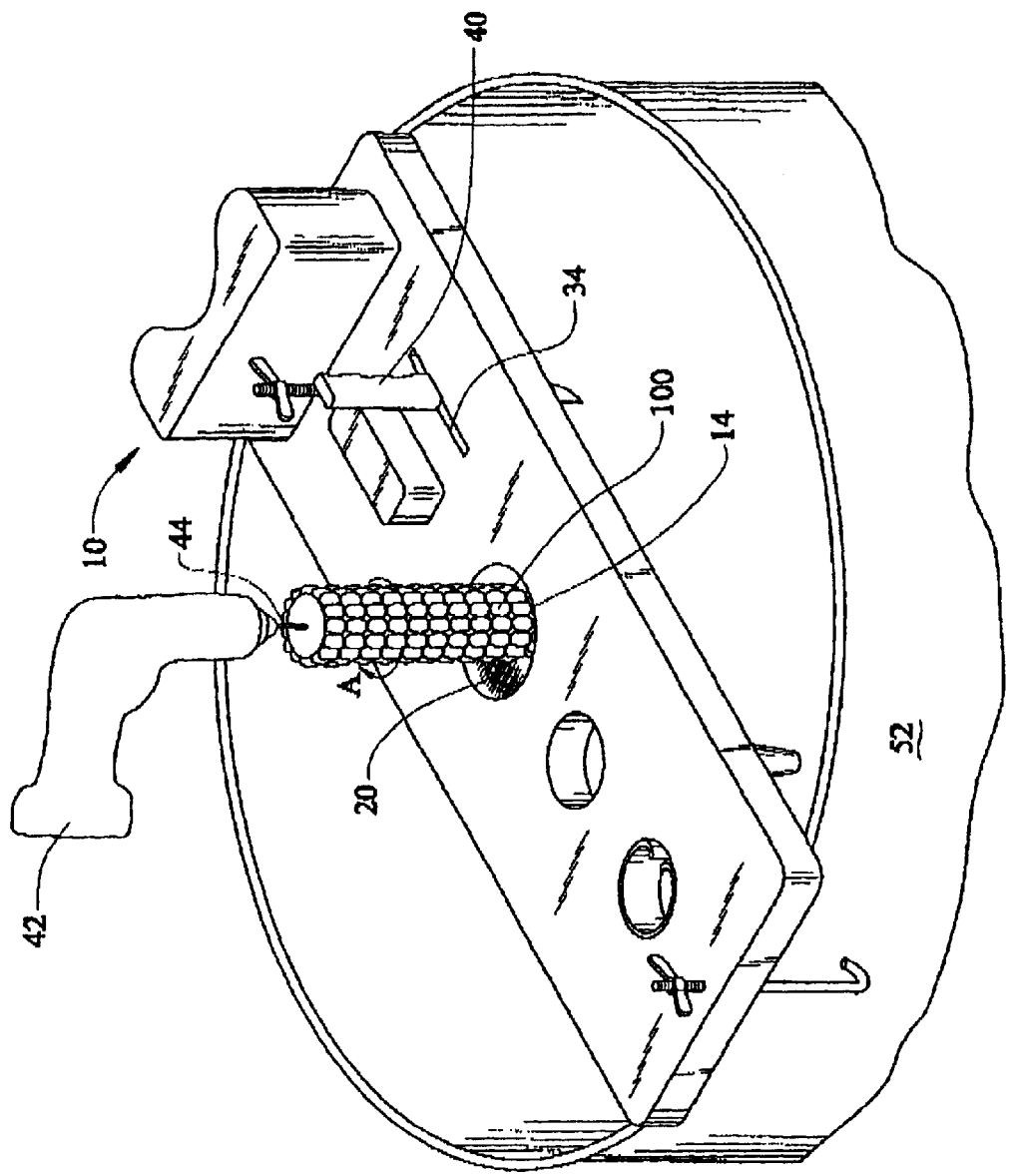
FIG. 4C illustrates a perspective view of the embodiment of the device of FIG. 1 having an ear of corn positioned in a cob cleaner aperture.

Referencing FIG. 4C, the ear of corn 100 is disposed through the cob cleaner aperture 14 preferably until the ear of corn 100 is fully disposed below the top surface 11 of the platform 12. The bit 44 and ear of corn 100 are rotated in direction A. Centrifugal force removes at least a portion of the shuck and silk into the optional receptacle 52 disposed below the device 10. While continuing to rotate the ear of corn 100 in direction A, the ear 100 is engaged with the cleaning member 20 (as illustrated) by which remaining shuck and/or silk is removed.

Figure 4D:
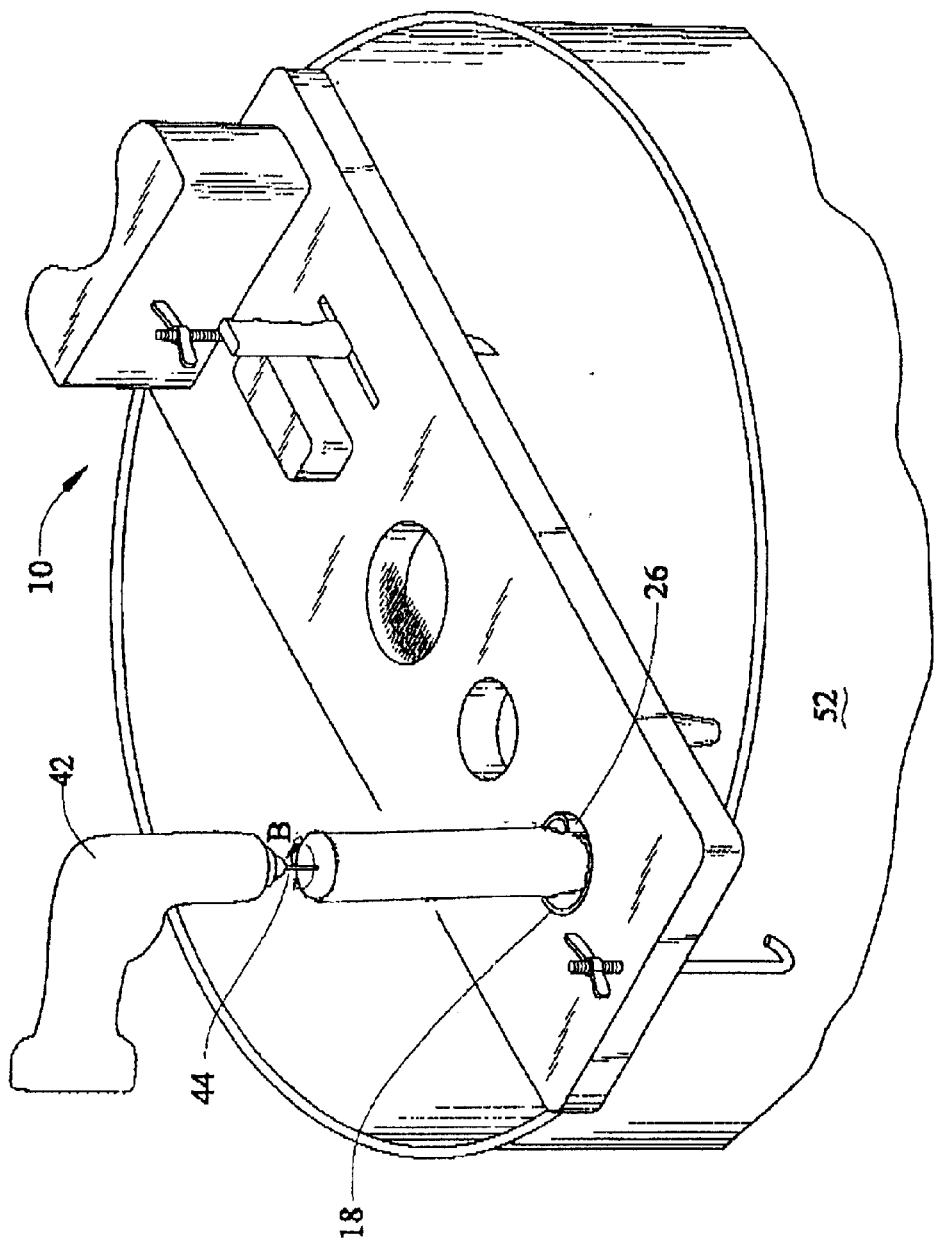
FIG. 4D illustrates a perspective view of the embodiment of the device of FIG. 1 having an ear of corn positioned in a cob removal aperture.

As illustrated in FIG. 4D, the cleaned ear of corn 100 is positioned in the cob removal aperture 18 preferably in a substantially upright manner. Grip 26, having ends protruding into the volume of the cob removal aperture 18, also engages the cob 100. The cob 100 can be disengaged from the hand-held drill 42 by urging the drill 42 away from the cob 100 while rotating the bit 44 of the drill 42 in direction B as the cob removal aperture 18 and grip 26, with at least one of the protruding ends digging into the cob 100, prevents the cob 100 from rotating. The ear of corn 100 is cleaned of the shuck and silk and can be prepared for storage or consumption.

Alternatively, the device for cleaning an ear of corn 10 can be used in conjunction with the device for making cream-style corn, as previously mentioned, or the like. The cleaned cob 100 should not be disengaged from the hand-held drill 42 until the user has completed employing the use of hand-held drill 42 to rotate the cob of corn 100.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A device for cleaning an ear of corn, the corn including at least one of shuck and silk, said device comprising:

a platform having a ton surface and a bottom surface;

a cob cleaner aperture arranged in said platform, said cob cleaner aperture being configured to receive an ear of corn therethrough; and a cleaning member extending into said cob cleaner aperture, said cleaning member being configured to engage an ear of corn inserted into said cob cleaner aperture such that, as an ear of corn is rotated and pressed against at least a portion of said cleaning member, at least a portion of at least one of the shuck and silk are removed from the ear of corn;

a cob support aperture arranged in said platform, said cob support aperture being configured to receive only a portion of the ear of corn and support the ear of corn in a substantially upright manner.

2. The device of claim 1, further comprising:

an elongated support member extending from said bottom surface of said platform and being substantially axially aligned with said cob support aperture;

wherein said cob support aperture and said elongated support portion are arranged and configured to releasably receive an ear of corn and support the ear of corn.

3. The device of claim 1, further comprising:

a cutting surface disposed on said top surface of said platform.

4. The device of claim 1, further comprising a cutting tool holder.

5. The device of claim 1, further comprising:

a platform support extending from said bottom surface of said platform, said platform support being arranged and configured to engage a receptacle for collecting waste from cleaning an ear of corn.

6. The device of claim 1, further comprising:

a cob removal aperture disposed through said thickness of said platform, said cob removal aperture being arranged and configured to receive an ear of corn and support the ear of corn while an item engaging the cob is disengaged therefrom.

7. A device for cleaning an ear of corn, the corn including at least one of shuck and silk, said device comprising:

a platform having a top surface and a bottom surface;

a cob cleaner aperture arranged in said platform, said cob cleaner aperture being configured to receive an ear of corn therethrough; and a cleaning member extending into said cob cleaner aperture, said cleaning member being configured to engage an ear of corn inserted into said cob cleaner aperture such that, as an ear of corn is rotated and pressed against at least a portion of said cleaning member, at least a portion of at least one of the shuck and silk are removed from the ear of corn;

a cob removal aperture disposed through said thickness of said platform, said cob removal aperture being arranged and configured to receive an ear of corn and support the ear of corn while an item engaging the cob is disengaged therefrom.

8. The device of claim 7, further comprising:

a cob support aperture arranged in said platform, said cob support aperture being configured to receive only a portion of the ear of corn and support the ear of corn in a substantially upright manner.

9. The device of claim 8, further comprising:

an elongated support member extending from said bottom surface of said platform and being substantially axially aligned with said cob support aperture;

wherein said cob support aperture and said elongated support portion are arranged and configured to releasably receive an ear of corn and support the ear of corn.

10. The device of claim 7, further comprising:
a cutting surface disposed on said top surface of said platform.

11. The device of claim 7, further comprising a cutting tool holder.

12. The device of claim 7, further comprising:
a platform support extending from said bottom surface of said platform, said platform support being arranged and configured to engage a receptacle for collecting waste from cleaning an ear of corn.

13. A device for cleaning an ear of corn, the corn including at least one of shuck and silk, said device comprising:
a platform having a ton surface and a bottom surface;
a cob cleaner aperture arranged in said platform, said cob cleaner aperture being configured to receive an ear of corn therethrough; and
a cleaning member extending into said cob cleaner aperture, said cleaning member being configured to engage an ear of corn inserted into said cob cleaner aperture such that, as an ear of corn is rotated and pressed against at least a portion of said cleaning member, at least a portion of at least one of the shuck and silk are removed from the ear of corn;
a cutting surface disposed on said top surface of said platform;
a cutting tool level extending from said top surface of said platform and being substantially adjacent said cutting surface; and
a cutting tool level adjuster being disposed on said cutting tool level, said cutting tool level adjuster being movable longitudinally along said cutting tool level;
wherein said cutting tool level and said cutting tool level adjuster can align a cutting tool to a position level with said cutting surface when the cutting tool contacts said cutting surface and said cutting tool level adjuster.

14. The device of claim 13, further comprising:
a cob support aperture arranged in said platform, said cob support aperture being configured to receive only a portion of the ear of corn and support the ear of corn in a substantially upright manner.

15. The device of claim 14 further comprising:
an elongated support member extending from said bottom surface of said platform and being substantially axially aligned with said cob support aperture;
wherein said cob support aperture and said elongated support portion are arranged and configured to releasably receive an ear of corn and support the ear of corn.

16. The device of claim 13, further comprising:
a cob removal aperture disposed through said thickness of said platform, said cob removal aperture being arranged and configured to receive an ear of corn and support the ear of corn while an item engaging the cob is disengaged therefrom.

17. The device of claim 13, further comprising a cutting tool holder.

18. The device of claim 13, further comprising:
a platform support extending from said bottom surface of said platform, said platform support being arranged and configured to engage a receptacle for collecting waste from cleaning an ear of corn.

19. A device for cleaning an ear of corn encased in shuck and silk comprising:
a platform, said platform having a top surface, a bottom surface and a thickness;
a cob cleaner aperture disposed through said thickness of said platform, said cob cleaner aperture being arranged and configured to receive at least a portion of an ear of corn therethrough;
a cleaning member having bristles, said cleaning member being disposed substantially adjacent said cob cleaner aperture and capable of engaging the ear of corn such that as the ear of corn is rotated and pressed against at least a portion of said cleaning member a portion of at least one of the shuck and silk are removed from the ear of corn;
a cob support aperture disposed through said thickness of said platform, said cob support aperture being arranged and configured to receive at least a portion of the ear of corn and support the ear of corn;
an elongated support member extending from said bottom surface of said platform being conically-shaped and substantially axially aligned with said cob support aperture, wherein said cob support aperture and said elongated support portion are adapted to releasably receive at least a portion of the ear of corn and support the ear of corn;
a cob removal aperture disposed through said thickness of said platform, said cob support aperture being arranged and configured to receive at least a portion of the ear of corn and support the ear of corn;
a grip disposed within said cob removal aperture, said grip protruding into said cob removal aperture and being adapted to inhibit rotation of the ear of corn when engaged therewith;
a cutting surface disposed on said top surface of said platform;
a cutting tool level extending from said top surface of said platform and being substantially adjacent said cutting surface;
a cutting tool level adjuster being disposed on said cutting tool level, said cutting tool level adjuster being movable longitudinally along said cutting tool level, wherein said cutting tool level and said cutting tool level adjuster can align a cutting tool to a position level with said cutting surface; and
a platform support extending from said bottom surface of said platform, said platform support being arranged and configured to engage a receptacle for collecting waste from cleaning an ear of corn.

* * * * *